Dec. 28, 1965 G. A. DOTTO 3,225,595
FLUID DEPTH MEASURING APPARATUS
Filed March 16, 1964 4 Sheets-Sheet 1
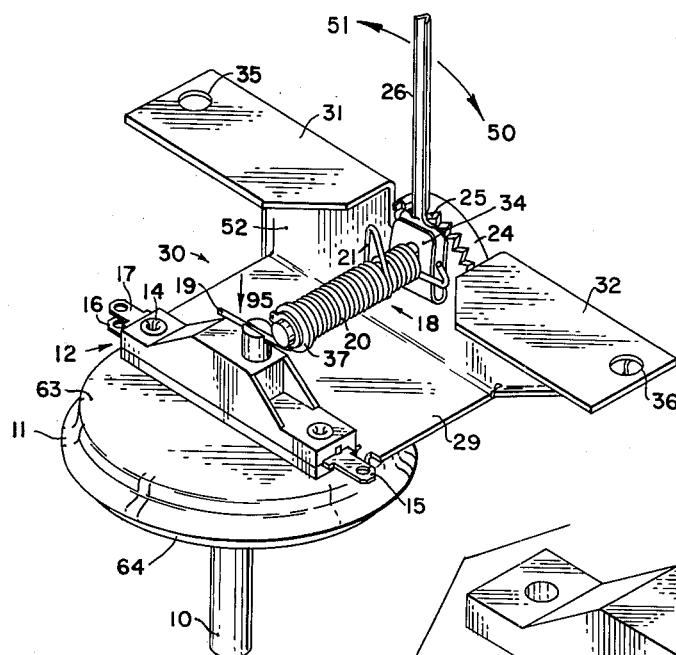
FIG. 1
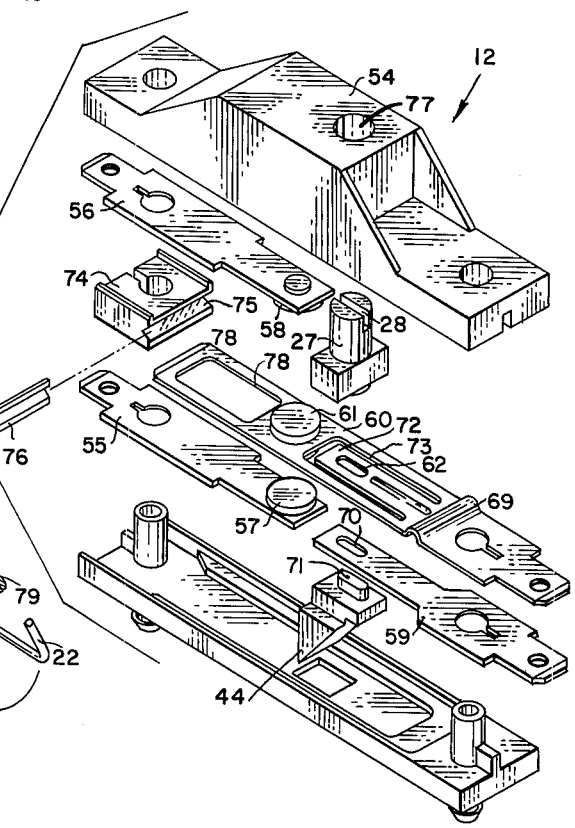
FIG. 2
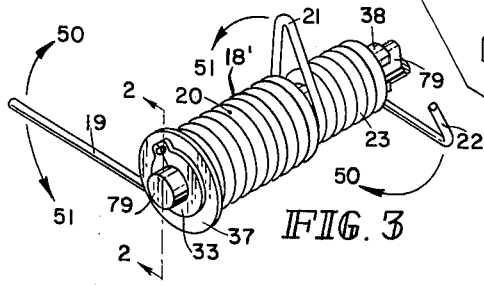
FIG. 3
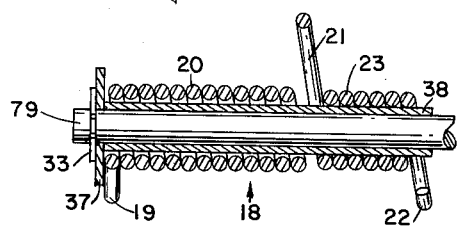
FIG. 4
INVENTOR.
DR. GIANNI A. DOTTO
BY
ATTORNEY Dec. 28, 1965 G. A. DOTTO 3,225,595

FLUID DEPTH MEASURING APPARATUS

Filed March 16, 1964 4 Sheets-Sheet 2

INVENTOR.
DR. GIANNI A. DOTTO
BY
ATTORNEY

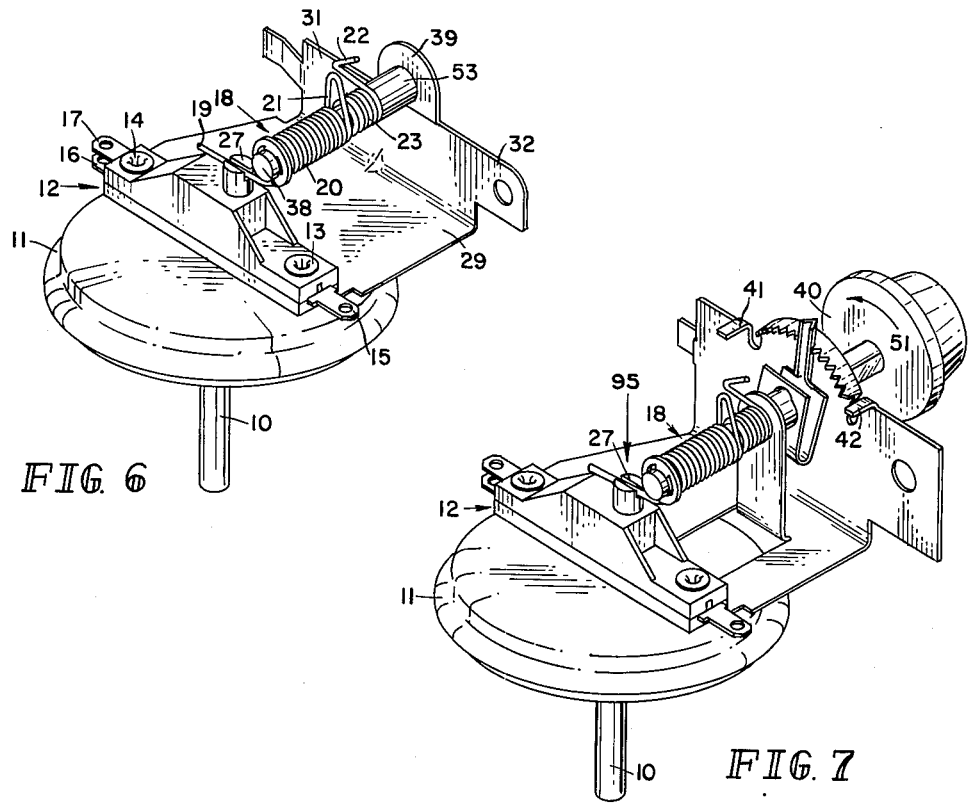
FIG. 6
FIG. 7
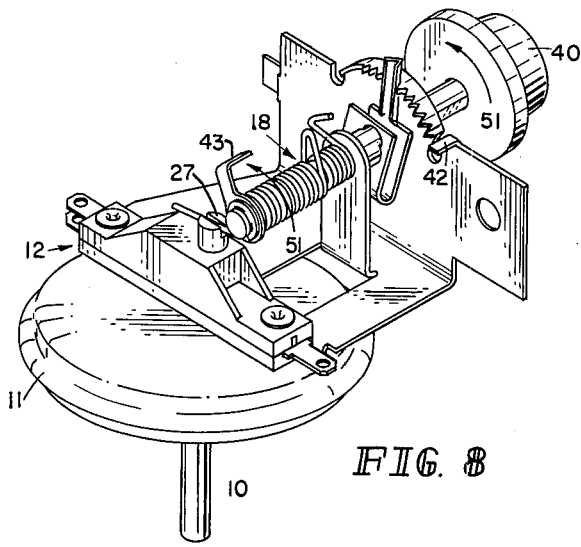
FIG. 8
INVENTOR.
DR. GIANNI A. DOTTO
BY
ATTORNEY Dec. 28, 1965  G. A. DOTTO  3,225,595
FLUID DEPTH MEASURING APPARATUS
Filed March 16, 1964  4 Sheets-Sheet 4

INVENTOR.
DR. GIANNI A. DOTTO
BY
ATTORNEY

United States Patent Office 3,225,595
Patented Dec. 28, 1965

3,225,595
FLUID DEPTH MEASURING APPARATUS
Gianni A. Dotto, Dayton, Ohio, assignor to P. R. Mallory & Co., Inc., Indianapolis, Ind., a corporation of Delaware
Filed Mar. 16, 1964, Ser. No. 352,028
14 Claims. (Cl. 73—301)

The present invention relates to an electrical pressure switch, specifically to an electrical fluid pressure actuated switch that is a self contained unit particularly useful for regulating the crest level of a fluid confined within a fluid container.

In an apparatus of this general nature it is desirable that an electrical pressure switch be actuated when a predetermined fluid crest level is exceeded. The electrical pressure switch will in turn actuate a second device which prohibits the further flow of fluid into a fluid container. The electrical pressure switch would necessarily include three essential elements to perform the aforementioned function; they are: a first means for sensing a change in the condition of the crest level of the fluid in the fluid container, a control means actuated when the predetermined condition or crest level is exceeded, and a second means for actuating the control means when the first mentioned means senses a change in the condition of the crest level of a fluid.

In an apparatus of this general nature, it is desirable that the electrical presure switch be responsive to an infinite number of prescribed or predetermined pressures such that the electrical pressure switch will permit the fluid container to fill with a fluid to a preselected and predetermined depth. It is equally essential the electrical pressure switch be inherently capable of resetting itself if the fluid container is coupled with other apparatus which cycles the flow of fluid into and out of the fluid container.

The electrical pressure responsive switch of the type hereinafter disclosed is particularly useful when utilized with an agitating device such as a washing machine, however, it is not intended that the utility of the present invention be restricted to use only with agitating devices such as a washing machine. It is apparent the present invention would have utility with many other devices in which it is desired that the present invention actuate an associated device when a predetermined pressure is exceeded. Other uses will be readily apparent to those individuals possessing ordinary skill in the art. However, since the use of the present invention is adequately illustrated when coupled with a washing machine, and in order to facilitate the structural and functional description of the present invention, the present invention will be described in association with a washing machine.

It is well known in the art that a diaphragm pressure responsive device is sensitive to the height of the crest of fluid in a fluid container and thus will provide accurate means for controlling of the height of the crest of fluid within a fluid container. It is also well known that a control valve or a float arm is sensitive to the crest level of fluid within a fluid container, however, both devices have been found unsatisfactory when exposed to the extremely violent agitation of the fluid container within a washing machine. If the fluid was not exposed to violent agitation, the control valve or the float arm would be satisfactory substitutes for the diaphragm pressure responsive device.

Prior electrical pressure switches utilize cumbersome and expensive manually adjustable cam wheels to select the predetermined fluid pressure at which the electrical pressure switch will be actuated. Thus it is apparent that the cam wheel regulating means is not desirable because of the use of complex and expensive manually operated cam wheels to regulate the fluid crest level within a container. By way of contrast the present invention provides an efficient, inexpensive, simple, accurate, and effective means for obtaining uniform fluid crest level results in each instance that a fluid container is refilled with a fluid. Therefore, an object of the present invention is to provide a control device for controlling a fluid pressure.

It is still a further object of the present invention to provide a control device for a series of electrical circuits operating at a predetermined point in a fluid cycle.

It is a further object of the present invention to provide a fluid pressure control device having a novel pressure switch and a novel means for presetting and adjusting the fluid responsive level of said switch.

Still another object of the present invention is to provide a novel pressure switch having a sensitive snap action switch.

Still a further object of the present invention is to provide a novel clutch spring device operating in conjunction with and as a governor for a snap action switch.

It is a further object of the present invention to provide an accurate pressure sensitive device inherently possessing an infinite number of predetermined pressure actuation settings.

It is a further object of the present invention to provide a novel snap action switch in conjunction with a novel spiral wound clutch spring assembly acting as a governor for the actuation of said snap action switch.

Still another object of the present invention is to provide an automatic control device for controlling fluid pressure of a fluid container having a novel control device that is capable of resetting itself after a predetermined point in a fluid cycle has been reached.

A further object of the present invention is to provide a fluid depth measuring apparatus having a novel spiral wound clutch spring assembly acting as a governor for the actuation of the fluid depth indicating circuitry.

The present invention in another of its aspects, relates to novel features of the instrumentalities of the invention described therein for teaching the principal object of the invention and to the novel principles employed in the instrumentalities whether or not these features and principles may be used in the said object and/or in the said field.

With the aforementioned objects enumerated other objects will be apparent to those possessing ordinary skill in the art. Also other objects will appear in the following description, appended claims, and appended drawings. The invention resides in the novel construction, combination, arrangement, and co-operation of elements as hereinafter described and more particularly as defined in the appended claims.

The appended drawings illustrate several novel and different embodiments of the present invention and constructed to function in the most advantageous modes devised for the practical application of the basic principles involved in the hereinafter described invention.

In the drawings:

FIGURE 1 is a perspective view illustrating an electrical pressure switch assembly and a clutch spring assembly in co-operative relationship and thus embodying the basic principles of the present invention.

FIGURE 2 is a perspective view illustrating a novel snap action switch.

FIGURE 3 is a perspective view of the novel clutch spring assembly.

FIGURE 4 is a cross sectional view of the novel clutch spring assembly taken on the plane of line 2—2 in FIGURE 3.

FIGURE 6 is a perspective view of the present invention illustrating an important embodiment whereby the electrical pressure switch is permanently biased at a predetermined actuation pressure by the clutch spring assembly.

FIGURE 7 is a view similar to FIGURE 1 but illustrating an adjusting knob for manually varying the pressure the clutch spring assembly exerts on the electrical pressure switch.

FIGURE 8 is a view similar to FIGURE 7, however, it illustrates a means for preventing overtravel of the adjusting knob used to vary the pressure of the clutch spring assembly.

Figure 5:
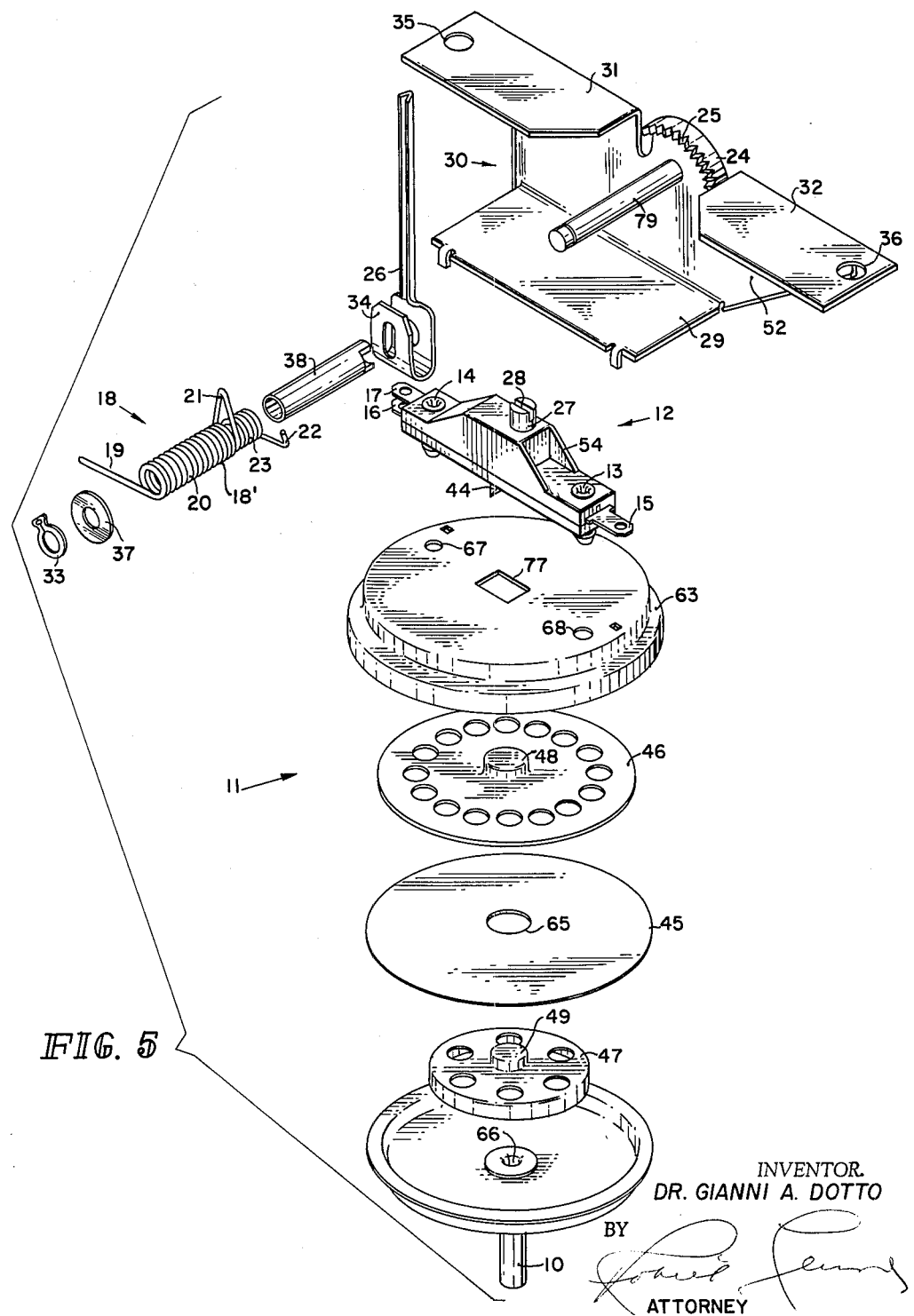
FIGURE 5 is a perspective view illustrating particularly the clutch spring assembly and its associated mounting, the electrical pressure switch and its associated mounting, and the diaphragm assembly and its associated mounting.

Generally speaking, the present invention comprises a manually adjustable condition responsive device having a diaphragm means for sensing a change in a fluid pressure, an adjustable control means for sensing when a predetermined fluid pressure is exceeded, and a means for actuating the control means when the diaphragm means senses a change in condition.

In the present invention, a fluid from a device to be controlled enters an orifice attached to the diaphragm means and exerts a pressure against the diaphragm means. The fluid pressure causes the diaphragm means and a movable arm to be displaced upwardly causing the movable arm to displace resilient blades of a switch of the adjustable control means upwardly. When the upward deflection exceeds the downwardly exerted force of an adjustable spring clutch assembly, part of the adjustable control means, the switch blade will snap from an initial position to a second position thus disengaging a first electrical circuit and engaging a second electrical circuit. Thereafter when the fluid pressure is reduced below a predetermined fluid pressure, the adjustable spring clutch assembly induces the switch blade to snap back to its initial position, that is disengaging a second electrical circuit and engaging a first electrical circuit.

Referring to the drawings a more detailed description of the present invention will be enumerated. In FIGURE 1 a housing or casing 11 incorporates an upper cup-like body section 63, open at its lower extremity, and an interfitting lower cup-like body section 64, open at its upper extremity, thus effectively closing the open lower extremity of the upper cup-like body section.

The upper section has an edge (not shown) circumjacent its outer periphery which is crimped or rolled over an annular shoulder of the lower section so as to clinch both the upper section and the lower section firmly in location in respect each to the other. The housing 11 can be manufactured from any suitable material, but preferably the upper body section 63 and the lower body section 64 are manufactured from a sheet metal stamping.

A resilient diaphragm 45 is positioned within housing 11 so as to extend laterally thwartwise the interior cross section of housing 11 thereby effectively partitioning the chamber of housing 11 into two separate and distinct compartments (not shown). The upper compartment is accessible to switch assembly 12 and is hereinafter referred to as the switch compartment (not shown). A pressure orifice 10 is interfitted with the lower cup-like body section 64, and can be either pressure fitted, welded, or soldered in position centrally of the lower body section. Pressure orfice 10 has an aperture 66 extending its entire cross-sectional length. A tubing (not shown) is coupled to orifice 10 permitting a fluid pressure present, if any, in the tubing to be transmitted from the tubing through aperture 66 in the pressure orfice 10 to the pressure compartment of housing 11.

Rigid disc 46, smaller in diameter than diaphragm 45, overlies the central portion of diaphragm 45 and is secured in position by node 49 of rigid disc 47. Node 49 projects through aperture 65 of diaphragm 45 and thereby interfits with node 48 of rigid disc 46, thus permanently fixing the physical location of diaphragm 45 and rigid discs 46 and 47 within housing 11. The purpose of rigid discs 46 and 47 is to maintain the center portion of diaphragm 45 substantially flat thus serve as a means of transmitting fluid pressure from the pressure compartment to electrical pressure switch assembly 12. Rigid discs 46 and 47 are manufactured from sheet metal stamping.

Electrical pressure switch assembly 12 is mounted to overlie a portion of the upper body section 63 of housing 11. Electrical pressure switch assembly 12 is retained securely in position by rivets 13 and 14. Rivet 13 is located at one extremity of switch assembly 12 and extends therethrough forming a pressure fitting with aperture 68 of housing 11. Rivet 14 is at the opposite extremity of switch assembly 12 from rivet 13 and like rivet 13 it extends through switch assembly 12 forming a pressure fitting with aperture 67 of housing 11.

Electrical pressure switch assembly 12 is afforded access to the switch compartment by means of movable arm 44 which projects through aperture 77 of housing 11. Movable arm 44 is constructed of a non-conducting, but rigid material such as plastic. Movable arm 44 is constructed of sufficient length so as to be in physical contact with node 48 of rigid disc 46 regardless of the physical location of rigid disc 46 and associated diaphragm 45. Thus any vertical deflection of diaphragm 45 as a result of a change in fluid pressure in the pressure compartment of housing 11 will be transferred from diaphragm 45 and associated rigid disc 46 to movable arm 44 causing a vertical deflection of movable arm 44 corresponding to the vertical deflection of diaphragm 45 and associated rigid disc 46.

The electrical pressure switch assembly 12 includes a housing 54 constructed of an electrically non-conducting, but rigid material such as plastic. Contained within housing 54 are resilient blades 59 and 60 which are coupled at one extremity to housing 54 by plastic rivet 13. The opposite extremity of resilient blade 59 is free to move in a vertical direction. Lying in the same horizontal plane and in close proximity with resilient blade 59 is stationary blade 55. Overlying resilient blade 59 and stationary blade 55 is resilient blade 60, one end of which is securely held in position by rivet 13 whereas the opposite extremity is held in position by slotted end position 75 of securing block 74 and notched seat 76.

The extremity opposite the rivet 13 of resilient blade 59 possess an aperture 70 in which node 71 of movable arm 44 interfits. Therefore vertical deflection by movable arm 44 will be transferred to resilient blade 59 and resilient blade 59 will be displaced vertically proportional to the vertical displacement of movable arm 44. As disclosed hereinbefore resilient blade 60 overlies both resilient blade 59 and stationary blade 55. Blade 60 possesses aperture 62 in which node 71 of movable arm 44 interfits. Thus a vertical deflection of movable arm 44 is transferred to resilient blade 59 and thence to resilient blade 60 so as to displace electrical contact 61 of resilient blade 60 in a vertical direction.

Resilient blade 60 possesses a U-shaped aperture 73 cut therein so as to form spring arm 72. A U-shaped node 69 is fashioned in blade 60 between the U-shaped aperture 73 of blade 60 and rivet 13 which retains one extremity of blade 60 in a fixed position. A rectangular shaped aperture 78 is fashioned in blade 60 between securing block 74 and electrical contact 61. Spring arm 72, U-shaped node 69, and aperture 78 co-operate in a novel manner such that spring arm 72 will snap upwardly or downwardly, depending on the spring arm 72 initial position, when there is a vertical deflection by movable arm 44 that is transferred to blade 59 and thence to blade 60. When spring arm 72 snaps either upwardly or downwardly owning to a vertical deflection by movable arm 44, electrical contact 61 carried by blade 60 will be displaced vertically proportional to the displacement of blade 60.

Partially underlying resilient blade 60 is stationary blade 55 possessing stationary electrical contact 57 underlying electrical contact 61 of resilient blade 60. A second stationary blade 56 partially overlies resilient blade 60 and possesses stationary electrical contact 58 which likewise overlies electrical contact 61 of resilient blade 60. Stationary blades 55 and 56 are coupled to housing 54 by plastic rivet 14 and are spaced apart by securing block 74.

Electrical contact 61 of blade 60 will snap into engagement with either of stationary electrical contacts 57 or 58 depending on the vertical direction of displacement of resilient blades 59 and 60. Electrical terminals 15, 16 and 17 are mounted externally on housing 54 and electrically coupled to electrical contacts 61, 57 and 58 respectively. Thus, an electrical circuit can be made between terminals 15 and 16 or between terminals 15 and 17 by the vertical deflection of contact 61 into engagement with either electrical contact 57 or electrical contact 58. The blades and associated electrical contacts are manufactured from an electrically conducting metal. From the foregoing disclosure it is manifest that the resilient, snap action blade 60 will actuate when a fluid pressure is exerted through orifice 10 into the pressure chamber and hence against rigid disc 47 and overlying diaphragm 45 thereby displacing rigid disc 46 and movable arm 44 upwardly. The movable arm 44 will cause the upward deflection of resilient blades 59 and 60 thus causing electrical contact 61 to snap from engagement with electrical contact 57 into engagement with electrical contact 58. When the fluid pressure is decreased in the pressure compartment, rigid plate 46 propels diaphragm 45 downwardly, thus movable arm 44 travels downwardly, reducing the upwardly pressure exerted by movable arm 44 against resilient blades 59 and 60 permitting electrical contact 61 to snap back to its original position of engagement with electrical contact 57.

The control mechanism for ascertaining the fluid pressure which must be exerted against diaphragm 45 to actuate electrical switch assembly 12 is contained within spring clutch assembly 18 in co-operative relation with a second movable arm or plunger 27. Plunger 27 extends into switch housing 54 through aperture 77 in housing 54 and abuts resilient blade 60. Plunger 27 is deflected vertically in proportion to the vertical deflection of resilient blade 60. Thus if plunger 27 was spring biased, it would impede the upward deflection of resilient blade 60 causing a greater fluid pressure to be exerted against diaphragm 45 before resilient blade 60 could be deflected upwardly. Plunger 27 is utilized to transfer a downwardly exerted pressure from clutch spring assembly 18 to resilient blade 60 thus impeding an initial upward deflection by resilient blade 60.

Clutch spring assembly 18 is disposed with respect to plunger 27 so as to exert a downwardly acting pressure in the direction of arrow 95 through plunger 27. A continuous helical spring or spiral spring 18' is wound around pivotable shaft 38 and is secured in place thereon by abutting retaining ring 37 and a co-operating locking ring 33 at the extremity of spiral spring 18' disposed nearest to plunger 27 and by shoulder 34 of J-shaped calibration lever 26 located at the extremity of spiral spring 18 disposed furthest from plunger 27.

The continuous spiral coil 18' is assembled into sundry distinct sections to facilitate the adjustment of the position spiral coil 18' occupies with respect to pivotable shaft 38 and hence the degree of downwardly exerted pressure by spiral coil 18'.

The sections of continuous spiral coil 18' are: a spring lever arm 22 disposed adjacent shoulder 34 of J-shaped calibration lever 26 and formed to resemble a hook, a series of tightly wound coils 23 coupled to spring lever arm 22, a tear drop shaped coil 21 coupled to the series of tightly wound coils 23, a series of loosely wound coils 20 coupled to tear drop shaped coil 21, and a spring arm 19 coupled to the loosely wound coils and so disposed as to interfit with slotted end portion 28 of plunger 27. Spiral coil 18' is wound around pivotable shaft 38 in such a manner that a manually exerted pressure in the direction of arrow 50 or clockwise direction, will displace spiral coil 18' with respect to pivotable shaft 38 in the clockwise direction thus reducing the downward pressure, as illustrated by arrow 95, exerted on plunger 27 by the spiral coil 18' thus permitting switch assembly 12 to be actuated by a decreased fluid pressure. If a manual pressure is exerted on tear drop coil 21 in the direction of arrow 51 or counterclockwise direction, spiral coil 18' will be displaced with respect to pivotable shaft 38 in the counterclockwise direction, thus increasing the downward pressure, illustrated by arrow 95, exerted on plunger 27, by spiral coil 18', therefore increasing the fluid pressure required to actuate switch assembly 12.

Clutch spring assembly 18' is secured in place with respect to switch assembly 12 by bracket 30. The plane of retaining wall 52 of bracket 30 in which pivotable shaft 38 of clutch spring assembly 12 is seated is at a right angle with the plane of pivotable shaft 38. A shaft 79 coupled to retaining wall 52 and at a right angle therewith is utilized to securely seat pivotable shaft 38, yet permit pivotable shaft 38 to pivot either clockwise or counterclockwise with respect to retaining wall 52.

Calibration lever 26 is rigidly coupled to pivotable shaft 38, at a right angle thereto, and parallel to the plane of retaining wall 52. Calibration lever 26 will be displaced in the direction of arrow 51 or counterclockwise, if a manual force is exerted thereagainst in a counterclockwise direction or in the direction of arrow 50 or clockwise direction, if a manual force in the clockwise direction is exerted thereagainst. It is manifest that displacement of the calibration lever 26 in the clockwise direction will permit switch assembly 12 to actuate under a decreased fluid pressure, whereas displacement of calibration lever 26 in a counterclockwise direction requires an increased fluid pressure to actuate switch assembly 12. It is obvious calibration lever 26 is utilized to either increase or decrease the amount of fluid pressure required to actuate switch assembly 12 subsequent to the initial calibration of the fluid pressure required to actuate switch assembly 12. The initial calibration of the fluid pressure required to actuate switch assembly 12 is normally performed by exerting a manual force against tear drop coil 21 or spring lever arm 22 as hereinbefore described. The clutch spring assembly is constructed of a material such as metal or the like.

Bracket 30 is unitary metal stamp, C-shaped structure including a base portion 29 riveted, welded, or pressure fitted to housing 11. A portion of bracket 30 is at a right angle with base portion 29. This portion of bracket 30 forms retaining wall 52 which is used as a supporting means for pivotable shaft 38 of clutch spring assembly 12. A third portion of C-shaped bracket 30 is at a right angle with retaining wall 52 and parallel with base portion 29 forming flanges 31 and 32 which are respectively apertured at 35 and 36 to afford a convenient means by which to attach fluid pressure actuated switch 12 to a washing machine. Flanges 31 and 32 are separated by a cut-out portion which extends into retaining wall 52 and terminates just above the aperture (not shown) of retaining wall 52 which seats pivotable shaft 38 of clutch spring assembly 18'. A segment of retaining wall 52 located just above the aperture (not shown) supporting the pivotable shaft 38 is constructed to resemble a half circle. The outer extremity of the half circle is folded at a right angle with the retaining wall 52 to form ratchet 24. Ratchet 24 includes ratchet teeth 25 used to support calibrating lever 26 at any one of an infinite number of predetermined positions.

In the operation of the embodiment of the present invention of FIGURES 1, 2, and 6–8, a fluid enters orifice 10 of the pressure compartment (not shown) from a device to be controlled and the fluid exerts a pressure against diaphragm 45. The pressure causes diaphragm 45 and movable arm 44 to be displaced upwardly causing movable arm 44 to displace resilient blades 59 and 60 upwardly. When the upward deflection is sufficient spring arm 72 of blade 60 will overcome the downwardly exerted force of spring assembly 18 through plunger 27 and will cause the U-shaped spring arm 72 and associated electrical contact 61 to snap out of engagement with electrical contact 57 and into engagement with electrical contact 58.

The clutch spring assembly 18' permits different settings such that one fluid pressure of a range of predetermined fluid pressures within the pressure compartment (not shown) of housing 11 will actuate the electrical pressure switch assembly 12. The foregoing is accomplished by either exerting a manual force on either tear drop coil 21 or spring lever arm 22 or utilizing one of the infinite number of settings of calibration lever 26. Such action effectuates a change in the compressive pressure continuous of spiral coil 18 such that a lessor or greater fluid pressure is exerted by the spiral coil 18 against diaphragm 45.

While it is desirable to provide an electrical pressure switch having means for varying the fluid pressures at which the switch will be actuated, the present invention can be constructed so as to actuate only at one preselected fluid pressure. Such a device is shown in FIGURE 6.

The embodiment of FIGURE 6 differs only in the construction of the clutch spring assembly 18. Since calibrating lever 26 is not necessary, it is eliminated and in the addition of sleeve 53 which overlies pivotable shaft 38 between spring lever arm 22 and retaining wall 52. Sleeve 53 abuts spring lever arm 22 and thus effectively prevents any displacement of the spiral coil 18 with respect of pivotable shaft 38.

The embodiment of FIGURES 7 and 8 include several features not found in the other figures. Both FIGURES 7 and 8 include a handle or knob 40 coupled directly to pivotable shaft 38 to facilitate ease in turning pivotable shaft 38. FIGURES 7 and 8 include flange 42 which is utilized to prevent over travel of calibrating lever 26 when turned in the clockwise direction. FIGURE 7 includes flange 41 to prevent over travel of calibrating lever 26 when turned in the counterclockwise direction. FIGURE 8 includes an L-shaped projection 43 abutting spring arm 19 and coupled to pivotable shaft 38 so as to prevent overtravel of calibration lever 26 in the counterclockwise direction.

Figure 9:
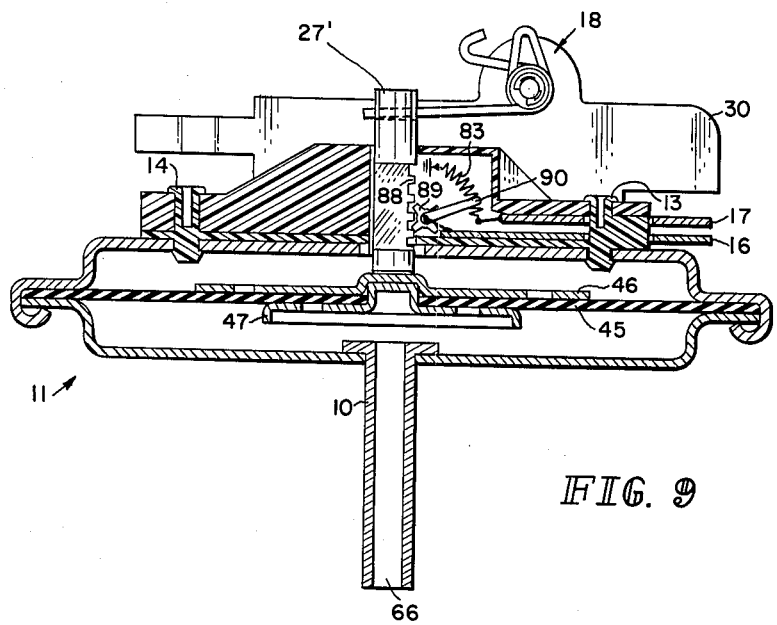
FIGURE 9 is a cross sectional view of the novel clutch spring assembly operatively associated with a plunger and a rheostat.
Figure 10:
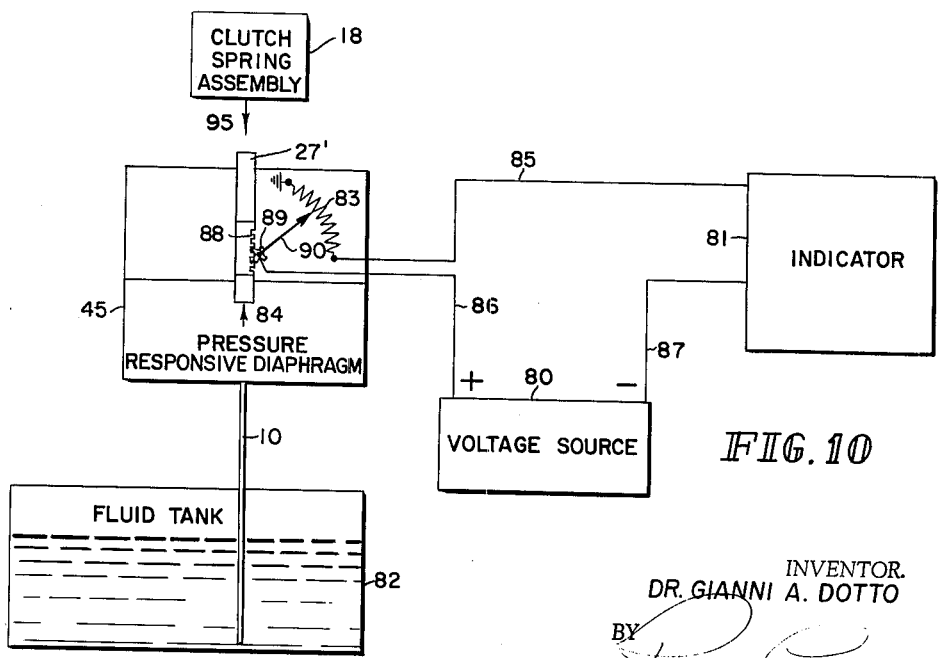
FIGURE 10 is a schematic showing the novel clutch spring assembly operatively associated with a plunger, rheostat and indicating circuitry.

The embodiment of FIGURES 9 and 10 include several modifications not found in prior figures. As hereinbefore enumerated a fluid pressure is exerted in an upwardly acting direction through orifice 10 to displace the pressure responsive diaphragm 45 in an upwardly direction as represented by arrow 84. Plunger 27' has one extremity that overlies the central portion of diaphragm 45, thus plunger 27' is deflected vertically in proportion to the vertical deflection of diaphragm 45. A clutch spring assembly 18 is disposed with respect to plunger 27' so as to exert a downwardly acting pressure in the direction of arrow 95 through plunger 27' thus impeding an upward deflection of plunger 27'.

As enumerated hereinbefore clutch spring assembly 18 can be manually adjusted to vary the amount of fluid pressure required to displace diaphragm 45, thus the pressure exerted to displace diaphragm 45 and hence plunger 27' is directly proportional to the crest level of the fluid contained within fluid container 82 irrespective of the size and shape of the said container. However, the embodiment of FIGURES 9 and 10 utilizes a rheostat 83 in co-operative relation with plunger 27' instead of a snap action switch in co-operative relation with a plunger 27 and a movable arm 45.

Plunger 27' has teeth 88 disposed longitudinally its periphery to co-operate with gear 89 of wiper arm 90 in such a manner as to displace gear 89 and wiper arm 90 in proportion to the fluid crest level in fluid container 82.

The first side of wiper arm 90 is electrically coupled to the first side of voltage source 80 by electrically conductive lead 86. The second side of wiper arm 90 is electrically coupled to rheostat 83 and wipes thereacross proportional to the vertical displacement of plunger 27', whose displacement is proportional to the fluid crest level in fluid container 82. A first side of rheostat 83 is coupled to ground whereas the second side of rheostat 83 is coupled to a first side of fluid depth indicator 81 by electrically conductive lead 85. A second side of fluid depth indicator 81 is coupled to a second side of voltage source 80 by electrically conductive lead 87.

The voltage drop across rheostat 83 therefore, is proportional to the fluid crest level of the fluid within container 82. Indicator 81 will be deflected in proportion to the fluid crest level. Indicator 81 can have a scale calibrated directly in units of depth or a scale calibrated as automotive gasoline gauges are calibrated, that is, full, one-half full and empty.

While the invention is illustrated and described in its preferred embodiments, it will be understood that modifications and variations may be effected without departing from the scope of the novel concepts of this invention and as set forth in the appended claims.

Having thus described my invention, I claim:

1. A manually adjustable condition responsive device actuated when a predetermined condition is exceeded comprising: a housing; flexible sheet mounted in said housing and extending thereacross so as to define a first compartment on a first side of said sheet and define a second compartment on a second side of said sheet; a first aperture in said housing to said first compartment so that the first chamber communicates with a condition; a second aperture in said housing to said second compartment; a movable arm extending through said second aperture and engaging said second side of said sheet so that said movable arm is displaced by said sheet when said sheet responds to a condition; and a switch responsive to the displacement of said movable arm only after said predetermined condition is exceeded, said predetermined condition determined by an adjustable clutch spring assembly mounted in proximity with said switch to prevent the actuation of said switch until said predetermined condition is exceeded, said adjustable clutch spring assembly comprises an adjustable clutch spring wound around a pivotable shaft, an adjustable lever coupled to said pivotable shaft so that when said lever is repositioned to a second predetermined position said clutch spring is repositioned at said second predetermined position.

2. A manually adjustable condition responsive device actuated when a predetermined condition is exceeded comprising: a housing; flexible sheet mounted in said housing and extending thereacross so as to define a first compartment on a first side of said sheet and define a second compartment on a second side of said sheet; a first aperture in said housing to said first compartment so that the first chamber communicates with a condition; a second aperture in said housing to said second compartment; and a movable arm extending through said second aperture and engaging said second side of said sheet so that said movable arm is displaced by said sheet when said sheet responds to a condition; and a switch responsive to the displacement of said movable arm only after said predetermined condition is exceeded, said predetermined condition determined by an adjustable clutch spring assembly mounted in proximity with said switch to prevent the actuation of said switch until said predetermined condition is exceeded, said clutch spring assembly comprising a clutch spring including a continuous spiral coil wound around a pivotable shaft, a first end of said coil extended in a first direction to form a first lever to allow adjustment of said clutch spring in a second direction, a portion of said coil extended beyond the normal circumference of said spiral coils to form a second lever to allow adjustment of said clutch spring in a third direction, a second end of said coils extended in such a direction so as to prevent actuation of said switch until a predetermined condition is exceeded.

3. A manually adjustable condition responsive device actuated when a predetermined condition is exceeded comprising: a housing; flexible sheet mounted in said housing and extending thereacross so as to define a first compartment on a first side of said sheet and define a second compartment on a second side of said sheet; a first aperture in said housing to said first compartment so that the first chamber communicates with a condition; a second aperture in said housing to said second compartment; a movable arm extending through said second aperture and engaging said second side of said sheet so that said movable arm is displaced by said sheet when said sheet responds to a condition; and a switch responsive to the displacement of said movable arm only after said predetermined condition is exceeded, said predetermined condition is determined by an adjustable clutch spring assembly mounted in proximity with said switch, said adjustable clutch spring assembly comprising a continuous spiral coil wound tightly around a pivotable shaft while traversing a first portion of said pivotable shaft and thereafter said coil is wound around said pivotable shaft loosely while traversing a second portion of said pivotable shaft, a first end of said coil extended in a first direction to form a first lever to allow adjustment of said clutch spring in a second direction, a portion of a coil extended beyond the normal circumference of the spiral wound coils to form a second lever to permit adjustment of said clutch spring assembly in a third direction, the second end of said coils extended in such a direction so as to prevent actuation of said switch until said predetermined condition is exceeded.

4. A fluid pressure actuated assembly actuated in accordance with a predetermined condition comprising: a housing; a movable member mounted in said housing which member responds to a fluid pressure; and switch means spring biased and coupled to said movable member so that said switch means is not actuated until a predetermined condition is exceeded, said spring bias means comprising a clutch spring assembly including a continuous spiral coil wound tightly around a pivotable shaft while traversing a first portion of said pivotable shaft and thereafter said coil wound around said pivotable shaft loosely while traversing a second portion of said pivotable shaft, a first end of said coil extended in a first direction to form a first lever to permit adjustment of said spring clutch assembly in a second direction, a portion of said coil of said spirally wound coil extended beyond the normal circumference of said spiral wound coil to form a second lever to permit adjustment of said clutch spring assembly in a third direction, the second end of said coil extended in such a direction so as to prevent actuation of said switch until a predetermined condition is exceeded.

5. A fluid pressure actuated assembly actuated in accordance with a predetermined condition comprising: a housing; a movable member mounted in said housing which member responds to a fluid pressure, and a snap switch means spring biased and coupled to said movable member so that said switch means is not actuated until a predetermined condition is exceeded, said snap switch means comprising a switch base, a first movable arm to actuate said switch, a contact carrying blade having a movable contact at one portion thereof, said contact carrying blade including a first extremity positioned in substantially fixed relationship with respect to said switch base, a U-shaped node fashioned in said contact carrying blade and positioned in close proximity to said first extremity, a U-shaped aperture fashioned in said contact carrying blade and positioned in close proximity to said U-shaped node, a movable contact positioned on said contact carrying blade and positioned in close proximity to said U-shaped aperture, a rectangular aperture fashioned in said contact carrying blade and in close proximity to said movable contact, and a second extremity of said contact carrying blade positioned in substantially fixed relation, with respect to said switch base, the combination co-active such that said movable contact is movable in opposite directions, means for securely mounting both ends of said contact carrying blade so that when said movable arm is displaced from its initial position said contact carrying blade is distorted in such a manner so as to break contact with a fixed contact and make contact with a second fixed contact, a second movable arm spring biased in such a manner to prevent said contact carrying blade from being displaced by said first movable arm until a predetermined condition is exceeded, and means for snapping back said contact blade to its initial position when a predetermined condition no longer exists.

6. A fluid pressure actuated assembly actuated in accordance with a predetermined condition comprising: a housing; a movable member mounted in said housing, said member responsive to a fluid pressure; a switch means coupled to said movable member; and a spring clutch assembly mounted in proximity with said switch means to prevent actuation of said switch until said predetermined condition is exceeded, said spring clutch assembly including an adjustable clutch spring wound around a pivotable shaft, an adjustable lever coupled to said pivotable shaft so that when said lever is repositioned to a second predetermined position, said clutch spring is repositioned at a second predetermined position, said position of said clutch spring determining said predetermined condition to which said switch is responsive.

7. A snap switch means comprising: a switch base; a first movable arm to actuate said switch; a contact carrying blade having a movable contact at one portion thereof, said contact carrying blade including a first extremity of said contact carrying blade positioned in substantially fixed relation with respect to said switch base, a node fashioned in said contact carrying blade and positioned in close proximity to said first extremity, an aperture fashioned in said contact carrying blade and positioned in close proximity to said node, a movable contact positioned on said contact carrying blade and positioned in close proximity to said aperture, a rectangular aperture fashioned in said contact carrying blade and in close proximity to said movable contact; and a second extremity of said contact carrying blade positioned in substantially fixed relation with respect to said switch base, the combination co-acting such that said movable contact is movable in opposite directions; means for securing mounting both ends of said contact carrying blade so that when said movable arm is displaced from its initial position said contact carrying blade is distorted in such a manner to break contact with a first fixed contact and make contact with a second fixed contact; a second movable arm spring biased in such a manner to prevent said contact carrying blade from being displaced by said first movable arm until a predetermined condition is exceeded; and means for snapping back said contact blade to its initial position when a predetermined condition no longer exists.

8. A snap switch means comprising: a switch base; a first movable arm to actuate said switch; a contact carrying blade having a movable contact at one portion thereof, said contact carrying blade including a first extremity of said contact carrying blade positioned in substantially fixed relation with respect to said said switch base, a U-shaped node fashioned in said contact carrying blade and positioned in close proximity to said first extremity, a U-shaped aperture fashioned in said contact carrying blade and positioned in close proximity to said U-shaped node, a movable contact positioned on said contact carrying blade and positioned in close proximity to said U-shaped aperture, a rectangular aperture fashioned in said contact carrying blade and in close proximity to said movable contact, and a second extremity of said contact carrying blade positioned in substantially fixed relation with respect to said switch base, the combination co-acting such that said movable contact is movable in opposite directions; means for securing mounting both ends of said contact carrying blade so that when said movable arm is displaced from its initial position said contact carrying blade is distorted in such a manner to break contact with a first fixed contact and make contact with a second fixed contact; a second movable arm spring biased in such a manner to prevent said contact carrying blade from being displaced by said first movable arm until a predetermined condition is exceeded; and means for snapping back said contact blade to its initial position when a predetermined condition no longer exists.

9. A fluid depth measuring apparatus comprising: a diaphragm means which responds to a fluid depth; a plunger means operatively displaced by said diaphragm means; a helical spring including an integral spring arm for biasing said plunger, the axis of said spring extending angularly with respect to the movement of said plunger; a rheostat means operatively associated with said spring biased plunger such that a voltage drop across said rheostat means is proportional to said fluid depth; an indicator means to register the fluid depth of a fluid coupled to a first side of said rheostat means; a voltage source means having a first side coupled to a second side of said indicating means, said voltage source having a second side coupled to a second side of said rheostat means.

10. A fluid depth measuring apparatus comprising: a diaphragm means which responds to a fluid depth; a plunger means operatively displaced by said diaphragm means; a clutch spring assembly for spring biasing said plunger, said clutch spring assembly comprising a continuous spiral coil wound tightly around a pivotable shaft while traversing a first portion of said pivotable shaft and thereafter said coil is wound around said pivotable shaft loosely while traversing a second portion of said pivotable shaft, a first end of said coil extended in a first direction to form a first lever to permit adjustment of said clutch spring assembly in a second direction, a portion of a coil of said spirally wound coil extended beyond the normal circumference of said spiral wound coil to form a second lever to permit adjustment of said clutch spring assembly in a third direction, the second end of said coil extended in such a direction so as to impede said upward deflection of said plunger so that said upward deflection is proportional to said fluid depth; a rheostat means operatively associated with said spring biased plunger such that a voltage drop across said rheostat means is proportional to said fluid depth; an indicator means to register the fluid depth of a fluid coupled to a first side of said rheostat means; and a voltage source means having a first side coupled to a second side of said indicating means, said voltage source having a second side coupled to a second side of said rheostat means.

11. A manually adjustable condition responsive device actuated when a predetermined condition is exceeded comprising: a housing; flexible sheet mounted in said housing and extending thereacross so as to define a first compartment on a first side of said sheet and define a second compartment on a second side of said sheet; a first aperture in said housing to said first compartment so that the first chamber communicates with a condition; a second aperture in said housing to said second compartment; a movable arm extending through said second aperture and engaging said second side of said sheet so that said movable arm is displaced by said sheet when said sheet responds to a condition, a switch responsive to the displacement of said movable arm only after said predetermined condition is exceeded; a helical spring mounted in proximity to said switch and having one end normally connected to said movable arm to provide a biasing force for said movable arm, the axis of said spring extending angularly with respect to the movement of said movable arm, and means for angularly shifting the other end of said spring to adjust said predetermined condition.

12. A fluid pressure actuated assembly actuated in accordance with a condition comprising: a housing; a movable member mounted in said housing, said member responsive to a fluid pressure; a switch means coupled to said movable member, said switch responsive to said movement of said movable member; and a helical spring including an integral spring arm for biasing said movable member, the axis of said spring extending angularly with respect to the movement of said movable member.

13. A fluid pressure actuated assembly actuated in accordance with condition comprising: a housing; a movable member mounted in said housing, said member responsive to a fluid pressure; a switch means coupled to said movable member, said switch responsive to said movement of said movable member; and a helical spring mounted in proximity to said switch and having one end normally connected to said movable member to provide a biasing force for said movable member, the axis of said spring extending angularly with respect to the movement of said movable member, and means for angularly shifting the other end of said spring to adjust said condition.

14. A fluid pressure actuated assembly actuated in accordance with a condition comprising: a housing; a movable member mounted in said housing which member responds to a fluid pressure; and a snap switch means coupled to said movable member and responsive to said movement of said movable member, said snap switch comprising a switch base, a first movable arm to actuate said switch, a contact carrying blade having a movable contact at one portion thereof, means for securingly mounting both ends of said contact carrying blade so that when said movable arm is displaced from its initial position said contact carrying blade is distorted in such a manner to break contact with a first fixed contact and make contact with a second fixed contact, said means for mounting both ends of said blade retaining said ends in the same plane during actuation of said blade, a second movable arm spring biased in such a manner to prevent said contact carrying blade from being displaced by said first movable arm until a condition is exceeded, and means for snapping back said contact blade to its initial position when a condition no longer exists, said spring bias including a helical spring having an integral spring arm for biasing said second movable arm, said spring extending angularly with respect to the movement of said second movable arm.

References Cited by the Examiner
UNITED STATES PATENTS

| | | | |
|---|---|---|---|
| 1,255,034 | 1/1918 | Mason | 73—301 |
| 2,286,717 | 6/1942 | Clason | 73—398 |
| 2,592,314 | 4/1952 | Morton | 137—387 |
| 2,593,473 | 4/1952 | McKnight. | |
| 2,825,780 | 3/1958 | Beller et al. | 200—83.9 X |
| 3,001,042 | 9/1961 | Cherry | 200—67 |

FOREIGN PATENTS

| | | |
|---|---|---|
| 784,729 | 10/1957 | Great Britain. |
| 576,509 | 5/1958 | Italy. |

DAVID SCHONBERG, *Acting Primary Examiner.*

LOUIS R. PRINCE, F. H. THOMSON, *Examiners.*